INVENTORS
SAM MESSIN
GEORGE D. HAVILLE
BY Zulwides, Mattingly & Huntley
Attorneys Sept. 24, 1963 S. MESSIN ETAL 3,105,192

FREQUENCY TRACKING AND DEVIATION INDICATING SYSTEM INCLUDING SIGNAL STORAGE MEANS

Filed April 19, 1960 3 Sheets-Sheet 2

INVENTORS
SAM MESSIN
GEORGE D. HAVILLE
BY Fulwider Mattingly & Huntley
ATTORNEYS Sept. 24, 1963 S. MESSIN ETAL 3,105,192

FREQUENCY TRACKING AND DEVIATION INDICATING SYSTEM INCLUDING SIGNAL STORAGE MEANS

Filed April 19, 1960 3 Sheets-Sheet 3

INVENTORS
SAM MESSIN
GEORGE D. HAVILLE
BY Fulwider Mattingly & Huntley
ATTORNEYS 3,105,192

FREQUENCY TRACKING AND DEVIATION INDICATING SYSTEM INCLUDING SIGNAL STORAGE MEANS

Sam Messin, Ventura, and George D. Haville, Santa Barbara, Calif., assignors, by mesne assignments, to Varo Inc. Electrokinetics Div., Santa Barbara, Calif., a corporation of California Filed Apr. 19, 1960, Ser. No. 23,259
6 Claims. (Cl. 324—79)

This invention relates to signal generators, and more particularly to a unique system responsive to a signal of relatively short duration to generate a signal of long duration of the same frequency.

In various situations, it is desired to determine the frequency of a signal of such short duration that the desired information cannot be obtained from the signal itself. However, there is no known satisfactory way of doing this. The signal may be "stored" for subsequent analysis or other use, as in computer techniques. But when it is so used, its duration is unchanged, so the technique of storing does not aid in determining its frequency.

In some instances, such short period signals are recurrent, as in sonar work. Should relative motion exist between the transmitting ship and the reflecting target, the received signal will apparently be shifted in frequency.

To segregate the reflected signals from background noise, it is customary to "gate" the receiver, so that it is permitted to develop an output during the times of arrival of the reflected signals. A reflected signal thus "seen" may be one that it is desired to check, as by analyzing the frequency thereof, or the change in frequency it has undergone, to determine certain factors, e.g., relative motion or velocity. Unfortunately, each signal is of such short duration that its frequency cannot readily be determined by prior art apparatus and techniques.

There are many other situations in which it is desired to know the frequency of a signal of short duration. These would include any situation wherein slight changes in the frequency of a signal are significant.

It is an object of this invention to provide a unique system responsive to a signal of short duration to develop a signal of relatively long duration at the same frequency.

It is another object of this invention to provide a frequency detection system capable of developing a continuous cyclical voltage from a voltage of only a few cycles duration.

It is still another object of this invention to provide a frequency tracking system to facilitate inspection of a signal of only a few cycles duration.

It is also an object of this invention to provide unique means for locking an oscillator for operation at the frequency of a signal of short duration.

A still further object of this invention is to provide unique frequency tracking means for automatically indicating visually the effect of movement of one object relative to another.

The above and other objects and advantages of this invention will become apparent from the following description taken in conjunction with the accompanying drawings of illustrative embodiments thereof, and in which:

FIGURE 1 is a block diagram of an automatic frequency tracking system in accordance with our invention, showing a frequency lock-on network to be selectively connected to a variable frequency voltage source, and showing an oscilloscope coupled to the lock-on network and operable from a pulse generator coupled to the source to display a trace indicating the degree of coincidence of the frequency of a voltage from the lock-on circuit with that from the source;

FIGURE 2*a* is a graph of the waveform of the vertical deflection control voltage, showing dots at points where the oscilloscope beam is unblanked by intensifying pulses from the pulse generator of FIGURE 1, wherein the dots occur at different points on successive sawtooth excursions whenever the output of the lock-on network is almost at the same frequency as the source voltage;

FIGURE 2*b* is a graph, similar to FIGURE 2*a*, wherein the dots are located at the same point on each sawtooth excursion to signify that the output of the lock-on network is precisely at the frequency of the source voltage;

Figure 4:
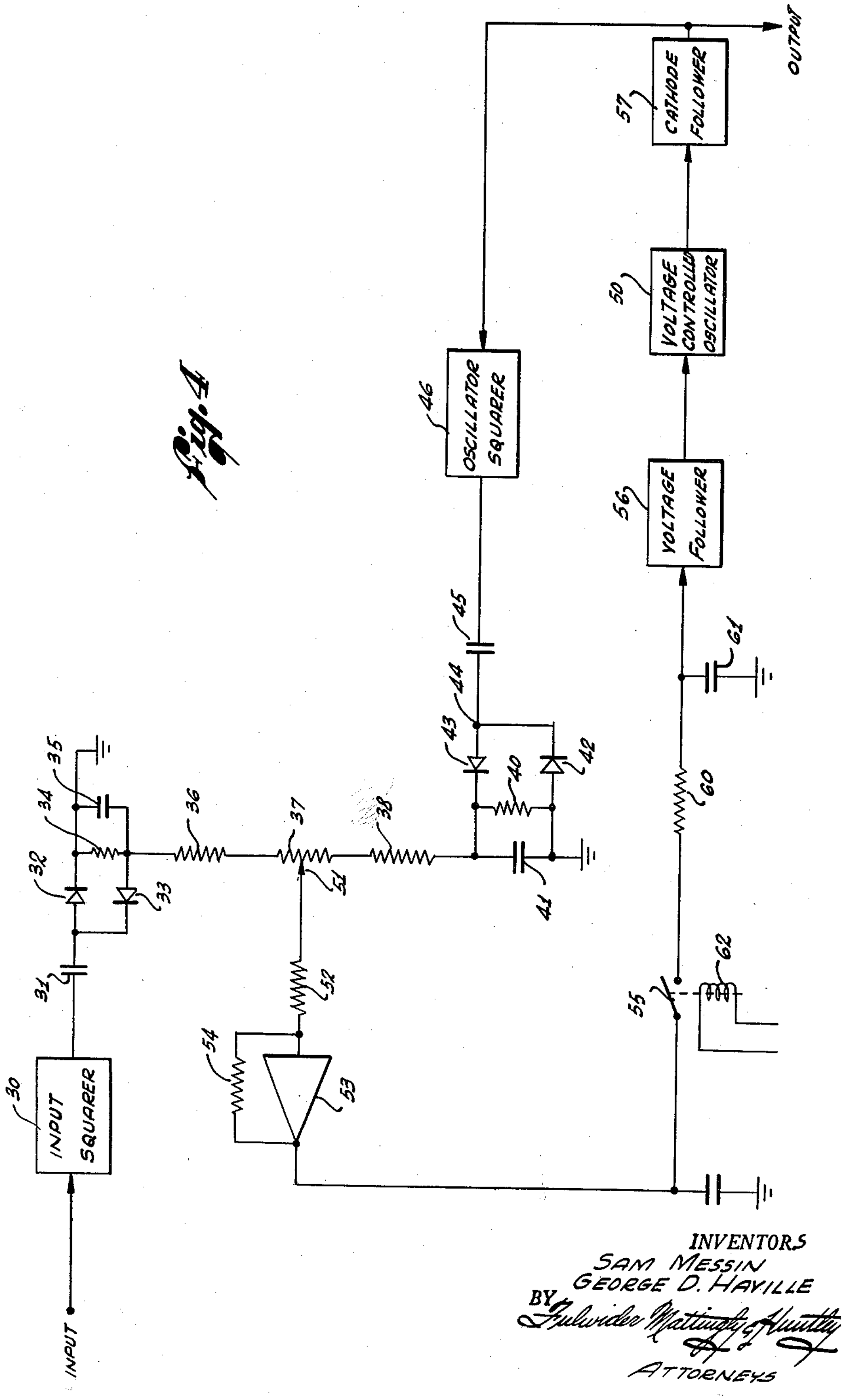
FIGURE 4 is a combined block and schematic diagram of our lock-on network.
Figures 5A, 5B, 5C, 5D, 5E, 5F, 5G, 5H, 5I:
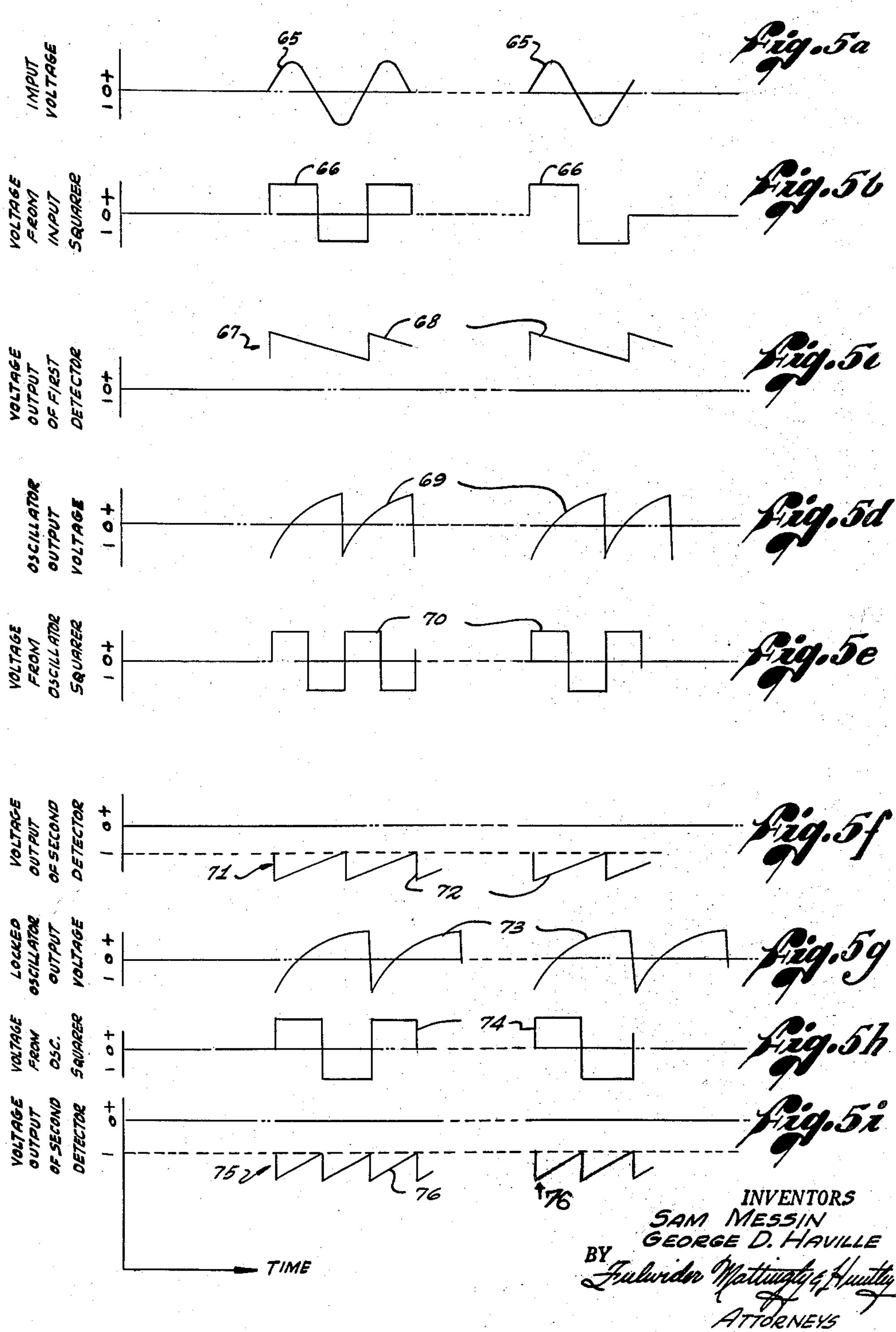

FIGURE 5*a* is the graph of the waveform of a cyclical input voltage to the input squarer of FIGURE 4;

FIGURE 5*b* is a graph of square waveform from the input squarer;

FIGURE 5*c* is a graph of the output of the D.-C. voltage developed from the square wave of FIGURE 5*b*;

FIGURE 5*d* is a graph of the cyclical output of the voltage controlled oscillator of FIGURE 4, for the situation where the oscillator output is higher in frequency than the input voltage;

FIGURE 5*e* is a graph of the square wave voltage developed from the cyclical voltage of FIGURE 5*d*;

FIGURE 5*f* is a graph of the D.-C. voltage developed from the square wave of FIGURE 5*e*;

FIGURE 5*g* is a graph of the cyclical voltage from the oscillator after having its operation changed, in response to the combination of the D.-C. voltages of FIGURES 5*c* and 5*f*, so as to be locked at the frequency of the input voltage of FIGURE 5*a*;

FIGURE 5*h* is a graph of the square wave developed from the corrected oscillator voltage of FIGURE 5*g*; and FIGURE 5*i* is a graph of the D.-C. voltage developed from the square wave of FIGURE 5*h*.

Figure 1:
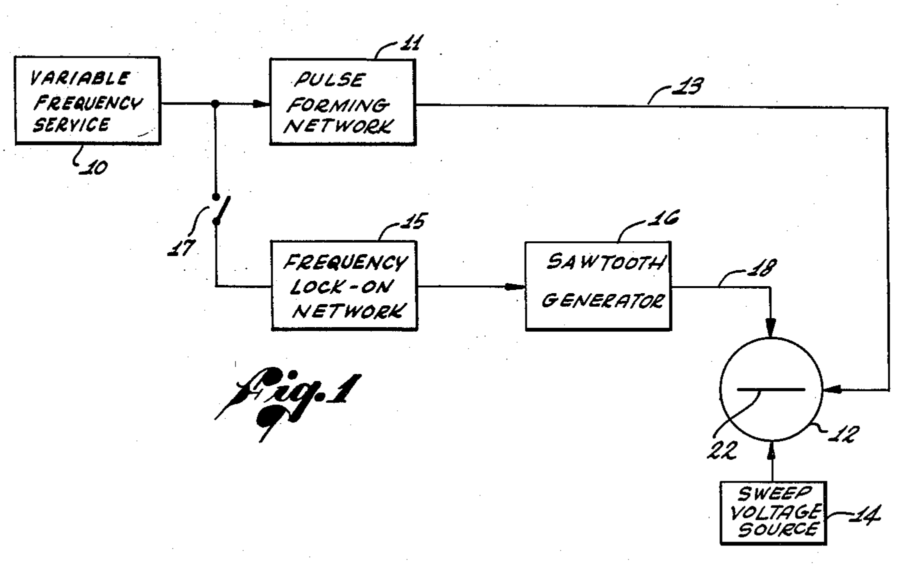

Referring to FIGURE 1, there is shown a system that includes a variable frequency voltage source 10. The source 10 may be any type adapted to develop output signals of different frequencies, e.g., an oscillator that can be selectively controlled; a "frequency scanning" system that switches between various bands and develops output voltages of the various signal frequencies; an underwater detecting system of the type previously indicated; etc. Thus, the source 10 may include means for transmitting sound signal pulses at spaced intervals, and receiver means for developing voltages corresponding to the pulses and the background noise. In this latter case, of course, the doppler effect results in the frequency of the energy fluctuations in successive pulses varying from the transmitted frequency.

Coupled to the output of the source 10 is a pulse forming network 11 that is adapted to develop a pulse for each cycle of the voltage from the source 10 that exceeds a predetermined level. The beam in the oscilloscope 12 is normally blanked, and the pulses from the pulse forming network 11 intensify the beam, as through a connection 13, so that a trace may be seen on the screen. For moving the beam horizontally, conventional horizontal sweep control is employed, as indicated by a sweep voltage source 14.

Vertical positioning of the beam is effected through a frequency lock-on network 15 and a sawtooth generator 16. As shown, the lock-on network 15 is adapted, as through a switch 17, to be connected to the source 10, and the sawtooth generator 16 is coupled, as indicated at 18, to the vertical deflection control circuit of the oscilloscope 12.

The lock-on network 15 normally develops a cyclical output voltage of a frequency much greater than the frequency of the sweep voltage. For example, the sweep voltage may be a 60-cycle voltage, and the output of the lock-on network is a voltage of many thousands of cycles per second. Accordingly, the sawtooth generator 16 develops a sawtooth voltage 20 (see FIGURES 2*a* and 2*b*) that moves the beam vertically hundreds of times every time the beam sweeps across the screen.

The lock-on network 15 is set to normally develop an output voltage of a frequency in the neighborhood of the frequencies of signals from the source 10. If both the frequencies are the same, the intensifying pulses will occur at the same points of the sawtooth waveform 20, thereby to establish dots 21 (see FIGURE 2*b*) on a horizontal line. Due to the multiplicity of sawtooth excursions during each sweep of the beam across the screen, the dots form a trace 22 (see FIGURE 1) that appears as a solid horizontal line.

Figure 2A:
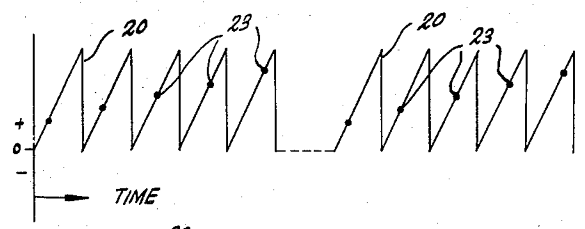
Figure 2B:
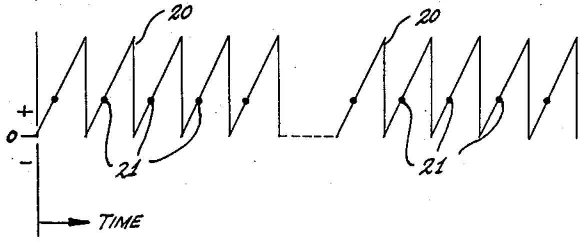
Figure 3:
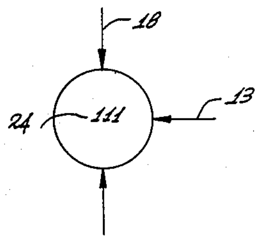
FIGURE 3 is a front view of the oscilloscope, showing the herringbone pattern exhibited in the situation illustrated in FIGURE 2*a*.

If the frequency of the voltage from the lock-on network 15 is different from that of the source voltage, the intensifying pulses from the pulse forming network 11 occur at different positions in succeeding sawtooth excursions. FIGURE 2*a* illustrates this result, with the dots 23 extending along lines at an angle with the horizontal. Intensifying the beam in this manner results in traces 24 (see FIGURE 3) that appear as solid lines forming a herringbone pattern. Such a pattern indicates that the output of the lockon network 15 is slightly different in frequency, and shifted in phase, from the output of the source 10.

To obtain the horizontal trace 22 shown in FIGURE 1, the switch 17 is momentarily closed. The network 15 responds to the output of the source 10 to readjust its frequency of operation to that of the signal appearing in the output of the source 10 during the period when the switch 17 is closed. When the network 15 is locked on the frequency of this signal, the horizontal trace 22 is formed on the screen.

As was previously mentioned, the source 10 may comprise a transmitter and receiver of underwater sound detecting apparatus. To enable the lock-on network 15 to adjust to the frequency of a reflected signal, the switch 17 is adapted to be closed during the time the reflected pulse is received. To this end, the switch 17 may be activated automatically from the transmitter, as through a delay line, to connect the lock-on network to the receiver at the time of arrival of the reflected signal.

The rate of approach to a reflecting reef from the ship, relative to the line of sight, is indicated by the manner in which the output of the lock-on network changes frequency, i.e., increasing for decreasing range and decreasing for increasing range. The output of the lock-on network continues at the freqency to which it is locked, whereby suitable measuring equipment, e.g., a frequency meter, can be connected to the lock-on network to determine the frequency of the signal. For a given doppler effect, the freqency of the reflected pulse, compared to the frequency of the transmitted pulse, provides information concerning the speed with which the ship is approaching the reef.

FIGURE 4 illustrates a unique circuit of our invention suitable for the lock-on network above described. This circuit includes a square wave forming network, designated an input squarer 30, for input signals. The output of this network, which is a square wave of fixed amplitude, is coupled through a capacitor 31 to a pair of unidirectionally conductive devices, shown as diodes 32, 33. The diodes 32, 33 are connected in series between the ends of an RC network 34, 35, and the junction of the diodes is connected to the capacitor 31. As shown, the diode 32 is connected to a point of reference or ground potential.

The D.-C. voltage developed by the above described circuit is applied to one end of a balance network that comprises resistors 36, 37, 38 connected in series. The resistor 38 is connected to the output of a similar D.-C. voltage source that includes an RC network 40, 41 connected between the resistor 38 and ground. Diodes 42, 43 are connected in series between the grounded and ungrounded ends of the RC network 40, 41, and the junction 44 of the diodes is coupled through a capacitor 45 to the output of a square wave forming network, designated as an oscillator squarer 46.

The oscillator squarer 46 is adapted to develop a square wave voltage of fixed amplitude from the output of a voltage controlled oscillator 50. The diodes 42, 43 and the RC network 40, 41 function to develop a corresponding D.-C. voltage, which appears at the resistor 38 opposite in polarity to the D.-C. voltage applied to the resistor 36.

The resistor 37 is used as a balancing means, and to this end it is provided with a sliding contact 51. The sliding contact 51 is initially positioned by applying a cyclical voltage to the input squarer 30 that is of the same frequency as the output of the oscillator 50, and which is in phase with the oscillator voltage. The sliding contact 51 is then adjusted to the electrical center of the balancing network 36, 37, 37, i.e., at a point where the algebraic sum of the voltages on either side of the sliding contact is zero.

After the sliding contact 51 is positioned, a signal applied to the input squarer 30, that differs in frequency from the oscillator voltage, causes a resultant voltage to appear at the sliding contact. Such voltage is utilized to change the frequency of operation of the oscillator until the resultant voltage is again zero, i.e., the output of the oscillator 50 is at the same frequency as the input signal.

To control the oscillator 50 in the desired manner, we connect the sliding contact 51 to the input resistor 52 of a high-gain amplifier, such as a conventional D.-C. or computing amplifier 53. The amplifier 53 is of the resistive feedback type, as illustrated by a resistor 54 connected between the output and the summing junction thereof. This type of amplifier, as is well known, is one that develops an amplified, inverted version of an input voltage. The amount of amplification is dependent on the ratio of the resistance of the feedback resistor 54 to that of the input resistor 52.

The amplifier 53 is adapted, through a switch 55, to be connected to the input of a unity-gain amplifier of the high input impedance type, and which is designated as a voltage follower 56. The follower 56 is coupled to the oscillator 50 which, as shown, is coupled through a cathode follower 57 to the oscillator squarer 46.

The oscillator 50 is the type that has a frequency of operation determined by the level of an input control voltage, a typical example of which is an oscillator employing a flip-flop multivibrator. The oscillator is arranged so that the frequency of its output is greater for smaller control voltages, and vice versa.

We provide charging means at the input of the voltage follower 56 so that when the switch 55 is closed for sampling the output of the amplifier 53, the control voltage at the input of the oscillator 50 is maintained for a substantial period of time. Such charging means includes a resistor 60 connected between the switch 55 and the input of the voltage follower 56, and a capacitor 61 connected between the input of the voltage follower and ground. The switch 55 may form a movable contact for a relay, in which case the relay coil 62 is adapted to be momentarily connected to an energizing source (not shown) at a predetermined time, e.g., the time of arrival of a reflected signal pulse in the underwater sound detection system above described.

With the above-described circuit arrangement, any net voltage appearing at the sliding contact 51 is amplified by the amplifier 53 and is available to be applied to the voltage follower. Before the switch 55 is closed, the oscillator is operating at a frequency determined by the charge on the capacitor 61. Since the switch 55 is open, and since the voltage follower has a very high input impedance, the charge on the capacitor 61 is maintained; hence, the control voltage at the output of the voltage follower 56 is maintained.

When the switch 55 is closed, the capacitor 61 charges or discharges to a new level, depending upon whether the output of the amplifier is a positive or a negative voltage. Along with the change in the charge on the capacitor 61, the oscillator control voltage is changed as a result of the action of the voltage follower 56. When the switch 55 is opened, the oscillator is operating at the frequency of the signal that was applied to the input squarer 30 during the interval that the switch 55 was closed.

To better understand the operation of our unique frequency tracking apparatus, reference may be had to FIGURES *5a–5i*, along with FIGURE 4. FIGURE *5a* illustrates the cyclical voltage 65 applied to the input squarer 30 of FIGURE 4 and FIGURE *5b* illustrates the voltage 66 in the output of the squarer 30. FIGURE *5c* shows the D.-C. voltage 67 developed from the square wave 66 as one having an A.-C. component, i.e., the RC network 34, 35 functions as on integrator to develop a voltage having ripples 68.

FIGURES *5d–5f* illustrate, respectively, a cyclical voltage 69 from the oscillator that is higher in frequency than the input voltage 65, and the resultant square wave 70 from the oscillator squarer 46 and the negative D.-C. voltage 71 from the RC network 40, 41. As with the D.-C. voltage 67, the D.-C. voltage 71 has an A.-C. component that appears as ripples 72.

With the switch 55 closed during the occurrence of the input voltage 65, the negative D.-C. voltage 71 is greater than the positive D.-C. voltage 67. Thus, a resultant negative voltage exists at the sliding contact 51. This negative voltage appears as an amplified positive voltage in the output of the amplifier 53. The capacitor 61 charges, thus causing the control voltage at the output of the voltage follower 56 to increase, whereupon the frequency of operation of the oscillator decreases. This results in the oscillator squarer 46 developing a square wave of lower frequency, and the negative D.-C. voltage from the RC network 40, 41 approaches a value such that the net voltage at the sliding contact 51 becomes zero. The voltages 73, 74 and 75 in FIGURES *5g–5i* depict the results. As shown, the D.-C. voltage 75 is a negative voltage wherein the frequency of the A.-C. component, as shown by the ripples 76, is the same as that of the A.-C. component of the voltage 67.

FIGURES *5g–5i* illustrate the desired results when the switch 55 is opened, i.e., the oscillator voltage 73 is of the same frequency as the input voltage 65, and is locked in phase with such input voltage. It is the A.-C. components that effect the desired phase relation, and which are utilized to "clamp" the oscillator to the desired frequency of operation. In this connection, it will be seen that if the RC networks developed pure, or unvarying, D.-C. voltages, the frequency of operation of the oscillator would change in the direction necessary to reduce the net voltages at the sliding contact 51 to zero. However, there would be no assurance that the corrected oscillator voltage was in phase with the signal voltage.

In our invention, we purposely arrange the RC networks so that the A.-C. components are present. When the oscillator frequency nears the sample frequency, the level of the resultant D.-C. voltage at the sliding contact 51 decreases. However, as the A.-C. components of the voltages from the RC networks approach the in-phase relation (corresponding to in-phase relation for the oscillator and sample frequencies) a large correction voltage occurs. This is a phase error voltage which, unlike the frequency correction voltage that decreases as the sample frequency s approached, suddenly increases as the in-phase relation is approached. This large correction voltage is amplified and fed to the oscillator to cause it to be locked in phase with the sample frequency.

When this phase lock is accomplished, the phase correction voltage reduces to zero. However, should the oscillator or sample voltages shift slightly in phase, the large phase correction voltage suddenly reappears to re-establish the phase lock condition.

Another advantage of our unique system is that the presence of the small A.-C. component in the control signal, i.e., at the output of the voltage follower 56, improves the speed and positiveness of lock-on. The action appears analogous to dither in a mechanical system; the A.-C. component in the control signal helps to start the oscillator operating in the desired direction of frequency change. Also, when the oscillator frequency reaches lock-on, this A.-C. component helps to prevent the oscillator from "overshooting" the sample frequency.

The effectiveness of our system in servoing the oscillator frequency quickly is demonstrated by an underwater sound detection system that transmits signal pulses of 25,000 cycles per second (25 kc.) The switch 55 is closed for a period of as low as ten milliseconds. Thus, our system corrects the frequency of operation of the oscillator in less than 250 cycles of the signal frequency.

While we have shown and described certain embodiments of our invention, it will be apparent that various modifications can be made without departing from the spirit and scope of our invention. Accordingly, we do not intend that our invention be limited, except as by the appended claims.

We claim:

1. A frequency tracking system comprising: a signal source; voltage controlled oscillator means; respective square wave developing networks coupled to said source and to said oscillator means; detecting means to develop respective D.-C. voltages from the outputs of said networks; means to apply a control voltage to said oscillator means that represents the difference between said respective voltages, said means including a resistive balance network connected between said detecting means; a computing amplifier coupled to said balance network; and switch means for coupling said computing amplifier to said oscillator means.

2. A frequency tracking system comprising: a signal source; voltage controlled oscillator means; respective square wave developing networks coupled to said source and to said oscillator means; detecting means to develop respective D.-C. voltages from the outputs of said networks, said means each including an integrating circuit; a pair of diodes connected in series across each integrating circuit; means to apply a control voltage to said oscillator means that represents the difference between said respective voltages, said means including a resistive balance network connected between said detecting means; a slidable contact for said balance network; a computing amplifier coupled to said slidable contact; a charging network; switch means for selectively connecting said charging network to said amplifier; and voltage follower means connected between said charging network and said oscillator means.

3. In combination with a variable frequency signal source, wherein a portion of the signals from the source includes a number of cycles of a given frequency, frequency tracking means comprising: means for sampling the portion of given frequency, said sampling means developing a first voltage of a magnitude corresponding to such frequency; oscillator means adapted to develop an output voltage over a range of frequencies, said oscillator means being characterized in that its frequency of operation corresponds to the magnitude of a control voltage therefor, said oscillator normally operating at a frequency in the vicinity of the frequency of the sampled signal portion; means developing a second voltage of a magnitude corresponding to the frequency of operation of said oscillator means; means responsive to said first and second voltages to develop a correction voltage for causing said oscillator means to operate at the frequency of the sampled signal portion; an oscilloscope having sweep, vertical and blanking control circuits for an electron beam, the blanking control circuit normally preventing the electron beam from being viewed; means coupled to the sweep control circuit for causing the beam to move horizontally; pulse forming means connected between said source and the blanking control circuit; and sawtooth generator means coupled between said oscillator means and the vertical control circuit.

4. An automatic frequency tracking and display system comprising: an oscilloscope having sweep, vertical and blanking control circuits for an electron beam, with the blanking control circuit normally preventing the electron beam from being viewed; a source of signals of varying frequency; means coupled to the sweep control circuit for cyclically moving the beam horizontally; pulse forming means connected between said source and the blanking control circuit for unblanking said beam in synchronism with said source; and vertical movement means connected between said source and the vertical control circuit to effect vertical movement of the beam at a frequency equal to the frequency of a predetermined portion of signals from the source, said vertical movement means including an oscillator with means for locking it to the frequency of said predetermined portion of the signals from the source, with the pattern displayed on the scope indicating coherence between the output of said source and the output of said oscillator.

5. In a frequency tracking and indicating system, the combination of: an oscilloscope having sweep, vertical and blanking control circuits for an electron beam, with the blanking control circuit normally preventing the electron beam from being viewed; a source of signals of varying and relatively high frequency; means coupled to the sweep control circuit for cyclically moving the beam horizontally at a relatively low frequency; means for coupling said source to the blanking control circuit for unblanking said beam in synchronism with said relatively high frequency; a continuously running oscillator having a variable output frequency; means for intermittently coupling said source to said oscillator for changing the oscillator output frequency to that of said source; and means for coupling said oscillator output to the vertical circuit for cyclically moving the beam vertically at the oscillator output frequency, with a horizontal pattern on said oscilloscope indicating frequency coincidence between said source and oscillator and a sweked pattern indicating frequency deviation.

6. In a frequency tracking and indicating system, the combination of: an oscilloscope having sweep, vertical and blanking control circuits for an electron beam, with the blanking control circuit normally preventing the electron beam from being viewed; a source of signals of varying and relatively high frequency; means coupled to the sweep control circuit for cyclically moving the beam horizontally at a relatively low frequency; means for coupling said source to the blanking control circuit for unblanking said beam in synchronism with said relatively high frequency; a continuously running oscillator having a variable output frequency; a comparison circuit including first and second detectors energized by said source and oscillator respectively, each of said detectors producing an output having a D.C. component of a magnitude which is a function of the frequency of the input thereto and an A.C. component of frequency and phase which are functions of the frequency and phase of the input thereto, with said detector outputs coupled together in cancelling relation to produce a comparison circuit output; means for intermittently coupling said comparison circuit output to said oscillator for changing the oscillator output frequency and phase to that of said source; and means for coupling said oscillator output to the vertical control circuit for cyclically moving the beam vertically at the oscillator output frequency.

References Cited in the file of this patent

UNITED STATES PATENTS

| | | |
|---|---|---|
| 2,389,992 | Mayle | Nov. 27, 1945 |
| 2,416,351 | Schelling | Feb. 25, 1947 |
| 2,433,804 | Wolff | Dec. 30, 1947 |
| 2,476,804 | Boykin | July 19, 1949 |
| 2,513,731 | Laughlin | July 4, 1950 |
| 2,537,081 | Page et al. | Jan. 9, 1951 |
| 2,554,806 | Beagles | May 29, 1951 |
| 2,565,896 | Webb | Aug. 28, 1951 |
| 2,573,354 | Poch | Oct. 30, 1951 |
| 2,634,413 | Potter | Apr. 7, 1953 |
| 2,774,037 | Hansel | Dec. 11, 1956 |
| 2,774,872 | Howson | Dec. 18, 1956 |
| 2,826,694 | Ropiequet | Mar. 11, 1958 |
| 2,928,046 | Hansel | Mar. 8, 1960 |